United States Patent [19]
Himeno et al.

[11] Patent Number: 5,494,492
[45] Date of Patent: Feb. 27, 1996

[54] DISPERSE DYE COMPOSITION AND METHOD FOR DYEING HYDROPHOBIC FIBERS WITH IT

[75] Inventors: Kiyoshi Himeno; Kazuhisa Konishi; Ryouichi Sekioka, all of Kitakyushu, Japan

[73] Assignee: Dystar Japan Ltd., Osaka, Japan

[21] Appl. No.: 319,033

[22] Filed: Oct. 6, 1994

[30] Foreign Application Priority Data

Oct. 6, 1993 [JP] Japan ................................ 5-274898

[51] Int. Cl.$^6$ .................................................. C09B 67/22
[52] U.S. Cl. ........................... 8/639; 8/662; 8/696; 8/922
[58] Field of Search ................................ 8/639, 662, 696, 8/922

[56] References Cited

U.S. PATENT DOCUMENTS 4,537,597  8/1985  Bergmann et al. .................... 8/639

FOREIGN PATENT DOCUMENTS 0126406  11/1984  European Pat. Off. .
3112427  10/1982  Germany .
3142609  5/1983   Germany .
3345357  7/1985   Germany .
62-6592  2/1987   Japan .
623707   12/1981  Switzerland .

*Primary Examiner*—Margaret Einsmann
*Attorney, Agent, or Firm*—Oblon, Spivak, McClelland, Maier, & Neustadt

[57] ABSTRACT

A disperse dye composition comprising compounds of the formulae (I) and (II):

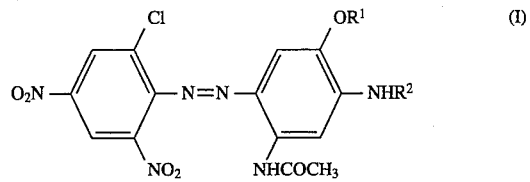

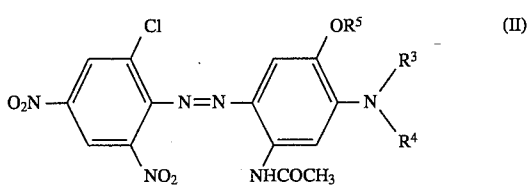

wherein each of $R^1$ and $R^5$ is a methyl group or an ethyl group, and each of $R^2$, $R^3$ and $R^4$ is a $C_{1-5}$ alkyl group, wherein the weight ratio of the compound of the formula (I) to the compound of the formula (II) is within a range of from 95:5 to 5:95.

3 Claims, No Drawings

DISPERSE DYE COMPOSITION AND METHOD FOR DYEING HYDROPHOBIC FIBERS WITH IT

The present invention relates to a disperse dye composition and a method for dyeing hydrophobic fibers with it. Particularly, it relates to a blue disperse dye composition having an excellent exhaustion property and a method for dyeing hydrophobic fibers with it. More particularly, it relates to a disperse dye composition which is stable against metal ions in the dye bath and which is suitable for dyeing relatively hardly dyeable polyester fibers so-called Shin-Gosen (modified polyester-containing fibers) with a deep color, and a dyeing method employing it.

To dye hydrophobic fibers such as polyester fibers with a deep blue color, it is common to employ a disperse dye in a large amount of at least 4% o.w.f. for the dyeing. If a dye is used in such a high concentration, the concentration of the dye remaining in the waste water from the dyeing will accordingly be high, whereby it tends to be difficult to reuse the water, and the COD value of the waste water will also be high. Further, there are many items desired to be improved in the dyeing of modified polyester fibers so-called Shin-Gosen which have shown remarkable commercial development recently.

For example, regarding ultrafine micro fibers and differential shrinkage combined yarn, studies are being made on deep color dyeing and a dyeing method not to impair feeling of fibers.

It is an object of the present invention to dye synthetic fibers such as polyester fibers with a deep blue color.

Another object of the present invention is to provide a dyeing method whereby the concentration of the dye remaining in the waste water from the dyeing can be minimized, so that recycling of the dyeing solution can be facilitated.

A further object of the present invention is to provide a dye composition and a dyeing method suitable for dyeing Shin-Gosen products such as fine denier polyester fibers or differential shrinkage combined yarn-type polyester fiber products.

The present invention provides a disperse dye composition comprising compounds of the formulae (I) and (II):

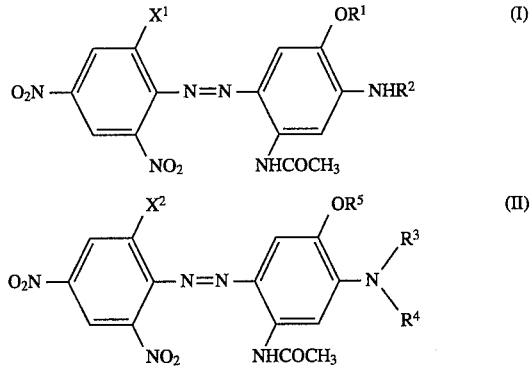

wherein each of $X^1$ and $X^2$ is a halogen atom, each of $R^1$ and $R^5$ is a methyl group or an ethyl group, and each of $R^2$, $R^3$ and $R^4$ is a $C_{1-5}$ alkyl group, wherein the weight ratio of the compound of the formula (I) to the compound of the formula (II) is within a range of from 95:5 to 5:95, and a method for dyeing hydrophobic fibers with such a disperse dye composition.

Now, the present invention will be described in detail.

The disperse dyes of the above formulae (I) and (II) are known compounds or compounds similar to known compounds (see e.g. Japanese Examined Patent Publication No. 6592/1987). Such dyes can be prepared by known methods. The weight ratio of the compound of the formula (I) to the compound of the formula (II) is within a range of from 95:5 to 5:95, preferably from 85:15 to 15:85, more preferably from 70:30 to 30:70. To prepare the dye composition, a conventional sand grinder mill may be employed, and sodium lignin sulfonate and/or a condensation product of formalin with sodium naphthalene sulfonate may optionally be used. In addition, an anti-dusting agent or a granulating agent may be used optionally as the case requires.

There is no particular restriction as to the dyeing conditions. However, the dyeing temperature is usually from 100° to 140° C., preferably from 110 to 130° C. Dyeing additives which are commonly used, such as a leveling agent and a dispersing agent, may suitably be used, as the case requires.

Hydrophobic fibers to be dyed, include normal polyester fibers, fine denier fibers and special fibers constituting so-called Shin-Gosen products, as well as synthetic fibers other than polyester fibers.

Now, the present invention will be described in further detail with reference to Examples. However, it should be understood that the present invention is by no means restricted to such specific Examples. Examples 1–1 to 1–3 and 1–6, 2–1 to 2–3, 3–1 and 3–2 Comparative Examples 1–1 to 1–6, 2–1, 2–2, 3–1 and 3–2 Reference Examples 1, 3–1 and 3–2

The dyes used in the Examples, Comparative Examples and Reference Examples are as follows.

Dyes

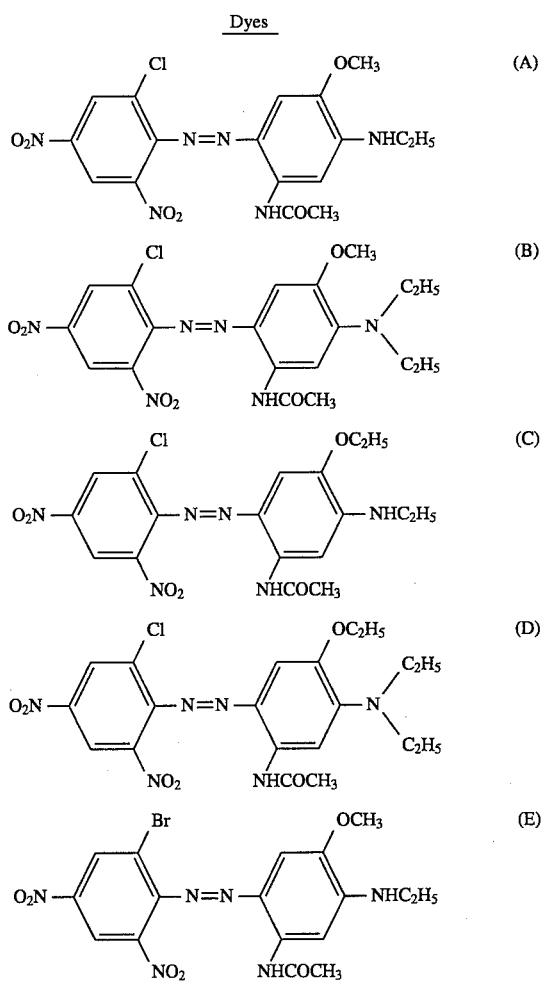

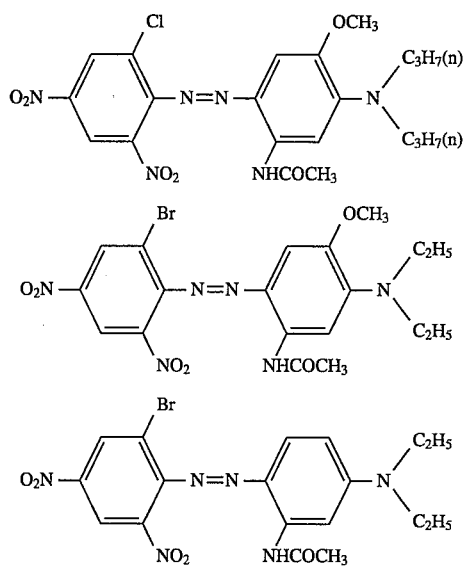

Preparation of dye compositions in the respective Examples, Comparative Examples and Reference Examples using these dyes, was carried out under the conditions similar to the following conditions for the preparation of the dye composition used in Example 1–1.

Namely, 12.0 g of a cake of the dye of the above formula (A) and 8.0 g of a cake of the dye of the above formula (B) were mixed with 40 g of sodium lignin sulfonate, 40 g of a condensation product of formalin with sodium naphthalene sulfonate and water, and the mixture was treated by a homomixer to obtain a uniform slurry having a solid content of 30%. The slurry was treated by a sand grinder mill into fine particles with an average particle size of at most 1 mμm, followed by drying by means of a spray drier to obtain a dye powder as the dye composition.

The fibers to be dyed, the dyeing conditions, the exhaustion property, the reproducibility in dyeing (color difference) and the water used for dyeing are as shown below.

Types of Fibers to be Dyed a. Conventional spun polyester fibers (fabric)

Tropical (product of Toray)

b. Differential shrinkage combined yarn-type polyester fiber fabric (Warp: highly shrinkable yarn, weft: normal yarn) Geena (trademark of Toyobo)

c. Fine denier polyester fiber fabric

Traysee (trademark of Toray)

| Dyeing conditions | | |
|---|---|---|
| I | Dye | 8% o.w.f. |
|  | Bath ratio | 1:15 |
|  | pH | 5 |
|  | Temp. × time | 135° C. × 30 minutes |
| II | Dye | 8% o.w.f. |
|  | Bath ratio | 1:15 |
|  | pH | 5 |
|  | Temp. × time | 120° C. × 60 minutes |
| III | Dye | 2% o.w.f. |
|  | Bath ratio | 1:15 |
|  | pH | 5 |
|  | Temp. × time | 130° C. × 60 minutes |
| IV | Dye | 12% o.w.f. |
|  | Bath ratio | 1:15 |
|  | pH | 5 |
|  | Temp. × time | 135° C. × 30 minutes |

Exhaustion Property

Dye baths before and after the dyeing were sampled, and the dye concentrations were optically measured, and the exhaustion property was evaluated by the remaining ratio (%) of the dye.

Measuring apparatus: Automatic spectrophotometer, Model U-3200

Solvent for measurement: 80% acetone water

Evaluation:

⊙Excellent, ◯Good,

X No good, X X Very Bad

Reproducibility in Dyeing (Color Difference)

A color change due to the influence of metal ions in the water used for dyeing, was evaluated by the color difference. The color difference was evaluated by ΔE of CIE L*a*b*. The relation between the degree of the sensuous color difference and the N.B.S. unit is as follows.

| Degree of sensuous color difference | N.B.S. unit |
|---|---|
| No or little color difference observed | 0 to 0.5 |
| Slight color difference observed | 0.5 to 1.5 |
| Substantial color difference observed | 1.5 to 3.0 |
| Remarkable color difference observed | 3.0 to 6.0 |
| Very high color difference observed | 6.0 to 12.0 |

Water Used for Dyeing

Usually, deionized water was used.

Fe: deionized water having 50 ppm of Fe ions (ammonium ferrous sulfate) added thereto was used. Cu: deionized water having 10 ppm of Cu ions (copper sulfate) added thereto was used.

The conditions in the respective Examples are shown in Tables 1, 2 and 3, and the obtained effects are also shown in the Tables.

TABLE 1

|  | Dyes | | Blend ratio (wt. ratio) | Type of fibers | Dyeing conditions | Exhaustion property (Remaining ratio (%)) | Evaluation of the exhaustion property |
|---|---|---|---|---|---|---|---|
| Example 1-1 | A | B | 60:40 | a | I | 3.2 | ⊙ |
| Example 1-2 | A | B | 30:70 | a | I | 3.4 | ⊙ |
| Example 1-3 | C | D | 85:15 | a | I | 4.5 | ⊙ |
| Comparative Example 1-5 | E | B | 70:30 | a | I | 4.2 | ⊙ |
| Comparative Example 1-6 | E | F | 60:40 | a | I | 2.4 | ⊙ |
| Example 1-6 | A | B | 60:40 | a | IV | 18.0 | ○ |
| Comparative Example 1-1 | A | — | 100:0 | a | I | 33.8 | X |
| Comparative Example 1-2 | — | B | 0:100 | a | I | 23.0 | X |
| Comparative Example 1-3 | A | — | 100:0 | a | IV | 67.0 | XX |
| Comparative Example 1-4 | — | B | 0:100 | a | IV | 56.1 | XX |
| Reference Example 1 | G | H | 40:60 | a | I | 13.3 | ○ |

TABLE 2

|  | Dyes | | Blend ratio (wt. ratio) | Type of fibers | Dyeing conditions | Exhaustion property (Remaining ratio (%)) |
|---|---|---|---|---|---|---|
| Example 2-1 | A | B | 70:30 | a | II | 8.8 |
| Example 2-2 | A | B | 70:30 | b | II | 1.2 |
| Example 2-3 | A | B | 70:30 | c | II | 0.9 |
| Comparative Example 2-1 | A | — | 100:0 | a | II | 63.5 |
| Comparative Example 2-2 | — | B | 0:100 | a | II | 52.8 |

TABLE 3

|  | Dyes | | Blend ratio (wt. ratio) | Type of fibers | Dyeing conditions | Metal ions | Reproducibility (color difference) | Notes |
|---|---|---|---|---|---|---|---|---|
| Reference Example 3-1 | A | B | 70:30 | a | III | — | Standard | |
| Reference Example 3-2 | A | B | 30:70 | a | III | — | Standard | |
| Example 3-1 | A | B | 70:30 | a | III | Fe | 0.37 | |
| Example 3-2 | A | B | 30:70 | a | III | Cu | 0.45 | |
| Comparative Example 3-1 | E | G | 70:30 | a | III | Fe | 1.21 | |
| Comparative Example 3-2 | E | G | 30:70 | a | III | Cu | 19.0 | Remarkable color change to red |

The disperse dye composition of the present invention is capable of dyeing hydrophobic fibers, particularly polyester fibers with a deep blue color. Especially when each of $X^1$ and $X^2$ in the formulae (I) and (II) is a chlorine atom, the exhaustion property is excellent, and the amount of the dye remaining in the waste water from the dyeing is very small. Further, the dye composition of the present invention is capable of dyeing fiber products which are generally regarded as hardly dyeable, such as fine denier polyester fibers or so-called Shin-Gosen, with a deep blue color.

We claim:

1. A disperse dye composition comprising compounds of the formulae (I) and (II)

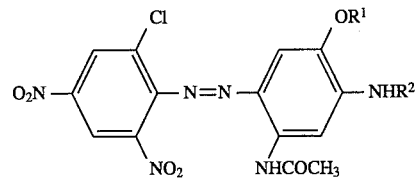

(I)

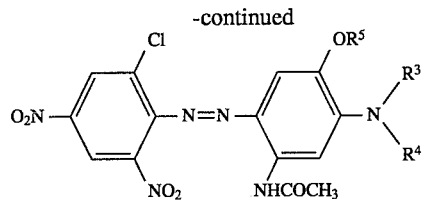

(II)

wherein each of $R^1$ and $R^2$ is a methyl group or an ethyl group, and each of $R^2$, $R^3$ and $R^4$ is a $C_{1-5}$ alkyl group, wherein the weight ratio of the compound of the formula (I) to the compound of the formula (II) is within a range of from 95:5 to 5:95.

2. A method for dyeing hydrophobic fibers with a dye composition, comprising dyeing the hydrophobic fiber with a dye composition as defined in claim 1.

3. The method according to claim 2, wherein the hydrophobic fibers are polyester fibers.

* * * * *